Oct. 1, 1935.  E. B. FOSTER ET AL  2,015,788
RETORT DOOR AND MEANS FOR LOCKING THE SAME
Filed May 3, 1934
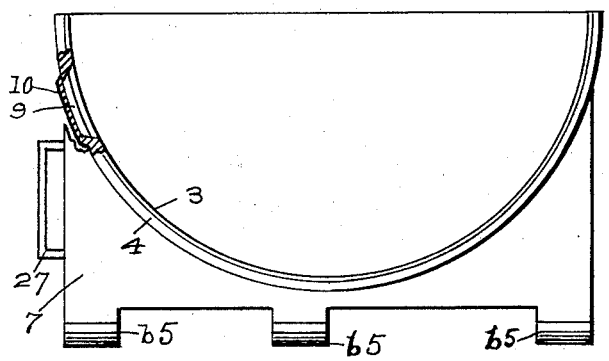
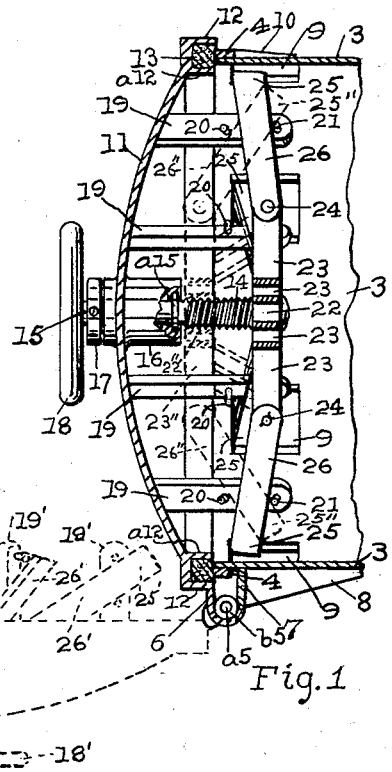
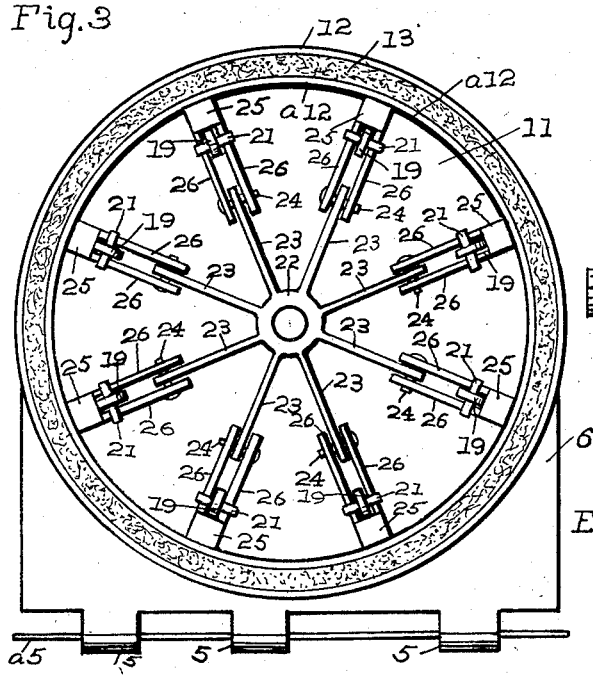
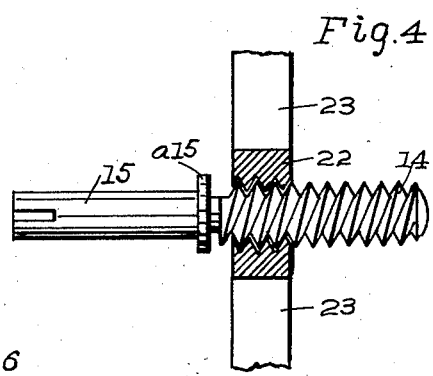
INVENTORS
Eugene B. Foster & John H. Burpee.
BY David E. Lain,
ATTORNEY.

Patented Oct. 1, 1935

2,015,788

UNITED STATES PATENT OFFICE 2,015,788

RETORT DOOR AND MEANS FOR LOCKING THE SAME

Eugene B. Foster and John H. Burpee, Bellingham, Wash.

Application May 3, 1934, Serial No. 723,712

2 Claims. (Cl. 220—57)

Our invention relates to improvements in retort doors and means for locking the same and has for an object to provide a strong, light-weight retort door suitable for fabrication by the welding method and equalizer clamping means attached to the door for locking the same.

Another object of our improvement is to provide a door seat on the retort suitable for fabrication by the welding method and completion thereby without the need of subsequent machining.

Other objects of our improvement will appear as the description proceeds.

We attain these and other objects of our improvement with the mechanism illustrated in the accompanying sheet of drawing, forming a part of this specification, in which Figure 1 is a plan view of a horizontal retort the upper part and the rear end of which are broken away, Fig. 2 is an elevation of the open end of the retort, from which the door is removed, a part of which is broken away on a medial vertical line, Fig. 3 is an elevation view of the inside of the retort door shown as dismounted from the retort cylinder, and Fig. 4 is a plan view of the door-clamping screw and a fragmentary part of the spider thereon, showing the nut in section drawn on a larger scale.

Similar characters refer to similar parts throughout. Certain parts are broken away to show other parts hidden thereby.

With more particular reference to the designated parts: A horizontally disposed retort cylinder 3 has the annular door jamb 4 welded on its open end, and the hinge plate 7 welded to the cylinder adjacent the jamb 4. The hinge plate 7 is welded to three aligned hinge bearings b5. Also adjacent the jamb 4 are eight spaced chambers 9 in the inner wall of the cylinder covered by the walls 10. Brace pieces 8 welded to the cylinder and the hinge plate 7 more securely fasten the plate and retain it in operative shape.

The retort door disc 11 is preferably convex outwardly and to its edge are welded the two rings 12 and a12 edgewise, which are spaced apart, providing an annular recess into which is pressed the packing ring 13 disposed to bear on the jamb ring 4 and seal the retort when the door is clamped in closing position.

A centrally disposed bearing hub 16 is welded to the door disc 11 with its axis coinciding with the axis of the retort cylinder when the door is in its closed position. Through the hub 16 is extended the screw spindle 15 and mounted therein for revolution. The annular boss a15 on the spindle bears on the inner end of the hub and seals the same when the door is locked by clamping pressure. The screw 14 has a relatively coarse thread and extends within the cylinder and bears the nut 22 engaged thereon and having a thread somewhat larger than the screw thread being mounted "wabbly" thereon. The screw spindle 15 extends outward beyond the hub and has the set ring 17 fastened thereon to bear on the outer end of the hub when the boss a15 bears on the inner end thereof. On the outer end of the spindle 15 is fastened the hand wheel 18 wherewith the screw 14 is revolved.

To one edge of the door 11 is welded an edge of the hinge plate 6 to the other edge of the plate are welded the hinge bearings 5, 5, 5 aligned and through which is extended the hinge rod a5, which is also extended through the hinge bearings b5, b5, b5 on the hinge plate 7 when the door is mounted in operative position on the retort cylinder as shown in Fig. 1.

There are eight bearing studs 19 fastened on the interior of the door plate 11 disposed in a circle concentric with the axis of the hub 16, spaced apart and each having a transverse hole near its outer end into which is fastened the fulcrum pin 21. Each of the studs 19 has another transverse hole near its longitudinal center into which is fastened the guide pin 20.

On the nut 22 are eight radial, spaced arms 23 near the outer end of which is a transverse hole all of which are in a circle concentric with the axis of the nut 22.

There are eight U-shaped, clamping levers 25 through the ends of the legs of which are holes for engaging them with the ends of the arms 23. The several levers 25 are alike and each is mounted astride one of the studs 19 between the pins 20 and 21 thereof and its legs are pivoted to the end of one the arms 23 by a pin 24.

The construction provides that when the nut 22 is adjacent the hub 16 and the annular boss a15, as shown in solid lines in Fig. 4, in dotted lines indicated by the primes of the designating characters in the opened door in Fig. 1 and in dotted lines indicated by the seconds of the designating characters in the closed door in Fig. 1, the levers 25 are disposed in inclined positions relative to the arms 23 and the outer ends thereof are all within a circle equal to and concentric with the door ring a12 and smaller than the inner circle of the door jamb 4, providing for the extension of all of these levers 25 through the door jamb 4 when the door 11 is swung on its hinges to a closed position as shown in Fig. 1. When the door is thus closed against the jamb 4, by turning the hand wheel 18 in a clockwise direction, thus revolving the left-hand screw 14 in its nut 22, the nut is forced farther into the retort, carrying the arms 23 therewith as well as the inner ends of the lever legs 26, till the inner edges of the said lever legs 26 bear on the fulcrum pins 21 and the closed lever ends 25 bear on the inner edge of the door-jamb ring 4 in the recesses 9, thus forcing the outer surface of the door jamb against the packing ring 13 till the retort door is sealed.

To clamp the door the nut was moved from its dotted position at 22" to its solid-line position at 22, the arms thereof were moved from their dotted positions at 23" to their solid-line positions at 23, and the levers were moved from their dotted positions at 26", 25" to their full-line positions at 26, 25. The positions of the parts in Fig. 1 within the closed door, which are shown in dotted lines for similar parts, are the same as the positions thereof in the open door of the same figure.

To unlock the door when closed and sealed, as described, the hand wheel 18 is turned in a counter-clockwise direction to return the nut 22 to a position adjacent the hub 16 at 22" which movement of the nut returns the other operative parts to their dotted positions, as described above, when the door may be swung open on its hinges to its dotted position at 11', where the several parts operative in clamping and sealing the door are shown in dotted lines and designated by the primes of their indicating characters. In practice it is usual to unlock and open retort doors soon after the steam has been shut off and before the pressure therein is reduced. When the hand wheel 18 is turned to unlock the door the inner ends of the levers 25 move toward the door while the outer ends thereof remain in contact with the inner surface of the door jamb 4 till the wheel has made several turns and the outer ends of the said levers have moved away from the door sufficiently to provide an opening between the door jamb and the door through which the steam escapes and reduces the retort pressure. Continued revolution of the wheel to open the door withdraws the levers from the door jamb and the door may be swung open without the need of resisting steam pressure.

As referred to above, in practice, our retort is fabricated of mild plate and sheet steel welded together. Hitherto, the retorts which our welded retorts replace have used a heavy cast iron ring flange riveted on the open end thereof to provide a door jamb which must be lathe finished. While the doors of these retorts are of cast iron lathe finished. Not only are these parts of the retort much more expensive to make than are the similar parts of the retort being described but they are several times as heavy.

In making our retorts, care is taken to construct the door jamb on the open end of the retort cylinder and the door channel to retain the sealing ring with as close accuracy as possible with the method used. Then the adaptability of the clamping and sealing mechanism is depended upon to accommodate itself to the small inaccuracies of the operatively juxtaposed surfaces and force them together in a sealing contact.

The parts of the mechanism most closely concerned in the automatic adjustments required to attain this end are the wabbly nut 22 and the evener action between the automatically adjusting ends of the arms 23 and the clamping levers 25, 26 fulcrumed on the pins 21.

The proper operation of the disclosed clamping means requires that the levers 25, 26 be relatively short. Even in the largest retort doors these levers are made as short as in those of smaller diameter in order that they may be operated with the minimum revolutions of the screw, be withdrawn the maximum distance to clear the jamb ring and be extended the maximum distance to engage the same.

Having thus disclosed our invention, what we claim as new therein and desire to secure by Letters Patent is,—

1. Retort closing mechanism including, a retort door having an annular recess on the interior thereof, an annular packing ring disposed in the said recess, a screw spindle mounted for revolution in a bearing on the door concentric with the said recess therein protruding externally, a hand wheel fastened on the outer end of the screw spindle, a screw integral with the inner end of the spindle, a threaded nut loosely mounted threadwise on the screw, a plurality of radial arms rigidly fastened to the nut, a plurality of studs spaced apart on the interior of the door equidistant from the screw, inner and outer transverse pins spaced apart on the said studs, a lever the inner end of which is pivotally connected to the outer end of each of the nut arms disposed between the said pins on each of the said studs, the inner edges of the said levers bearing on the inner stud pins, the outer ends of the levers being disposed farther from the door and nearer to the screw by revolving the screw to withdraw the nut and the outer edges of the levers bearing on the outer stud pins, the outer ends of the levers being disposed nearer the door and farther from the screw by revolving the screw to extend the said nut, a retort body having a circular opening therein, and a circular door jamb fastened around the said retort opening disposed to bear on the said packing ring when the door is closed and the said outer ends of the levers engaging the door jamb clamping the same against the said packing by extending the said nut.

2. Retort closing mechanism including, a circular retort door jamb having outer and inner surfaces, a retort door hinged on the retort to seat on the outer surface of the door jamb, a plurality of studs spaced apart on the inner surface of the door disposed equidistant from the center thereof, a pair of inner and outer pins transversely disposed on each of the said studs, a plurality of radial levers one thereof being disposed between each of the said pairs of pins, means operable from the exterior of the said door simultaneously to rock the said levers between the said pins to move the outer ends of the levers away from the door and toward the center thereof disposing the same for passing through the said circular jamb and within the retort, and means operable from the exterior of the door simultaneously to rock the said levers on the said outer pins to move the outer ends of the levers away from the door center and toward the door to bear on the inside surface of the said door jamb and on the said outer pins and force the door against the outer surface of the said door jamb.

EUGENE B. FOSTER.
JOHN H. BURPEE.